(12) United States Patent
Thelin et al.

(10) Patent No.: US 6,961,814 B1
(45) Date of Patent: Nov. 1, 2005

(54) DISK DRIVE MAINTAINING A CACHE LINK ATTRIBUTE FOR EACH OF A PLURALITY OF ALLOCATION STATES

(75) Inventors: Gregory B. Thelin, Garden Grove, CA (US); Ming Y. Wang, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 219 days.

(21) Appl. No.: 10/262,492

(22) Filed: Sep. 30, 2002

(51) Int. Cl.[7] .............................................. G06F 12/00
(52) U.S. Cl. ...................... 711/113; 711/137; 711/141; 711/171; 710/52; 710/56
(58) Field of Search ........................ 711/112, 113, 133, 711/134, 141, 144, 145, 170, 171, 137; 710/52, 710/56

(56) References Cited

U.S. PATENT DOCUMENTS

| | | | |
|---|---|---|---|
| 5,890,211 A * | 3/1999 | Sokolov et al. | 711/113 |
| 5,937,426 A * | 8/1999 | Sokolov | 711/113 |
| 6,018,789 A | 1/2000 | Sokolov et al. | 711/113 |
| 6,094,707 A | 7/2000 | Sokolov et al. | 711/113 |
| 6,408,357 B1 | 6/2002 | Hanmann et al. | 711/113 |
| 6,532,513 B1 * | 3/2003 | Yamamoto et al. | 711/100 |
| 6,757,781 B2 * | 6/2004 | Williams et al. | 711/112 |

OTHER PUBLICATIONS

Chang et al., "An Efficient Tree Cache Coherence Protocol for Distributed Shared Memory Multiprocessors", © 1999 IEEE, p. 352-360.*
Li et al., "Redundant Linked List Based Cache Coherence Protocol", © 1995 IEEE, p. 43-50.*
Gjessing, et al., "A Linked List Cache Coherence Protocol: Verifying the Bottom Layer", © 1991 IEEE, p. 324-329.*

* cited by examiner

*Primary Examiner*—Brian R. Peugh
(74) *Attorney, Agent, or Firm*—Howard H. Sheerin, Esq.

(57) ABSTRACT

A disk drive is disclosed comprising a cache buffer for caching data written to the disk and data read from the disk, the cache buffer comprising a plurality of cache segments linked together to form a plurality of cache links. At least one segment attribute is associated with each cache segment, including an allocation state, and at least one link attribute is associated with the segment attributes within each cache link. When a host command is received from a host computer, the link attributes are evaluated to allocate cache segments for a cache link associated with the host command.

26 Claims, 10 Drawing Sheets

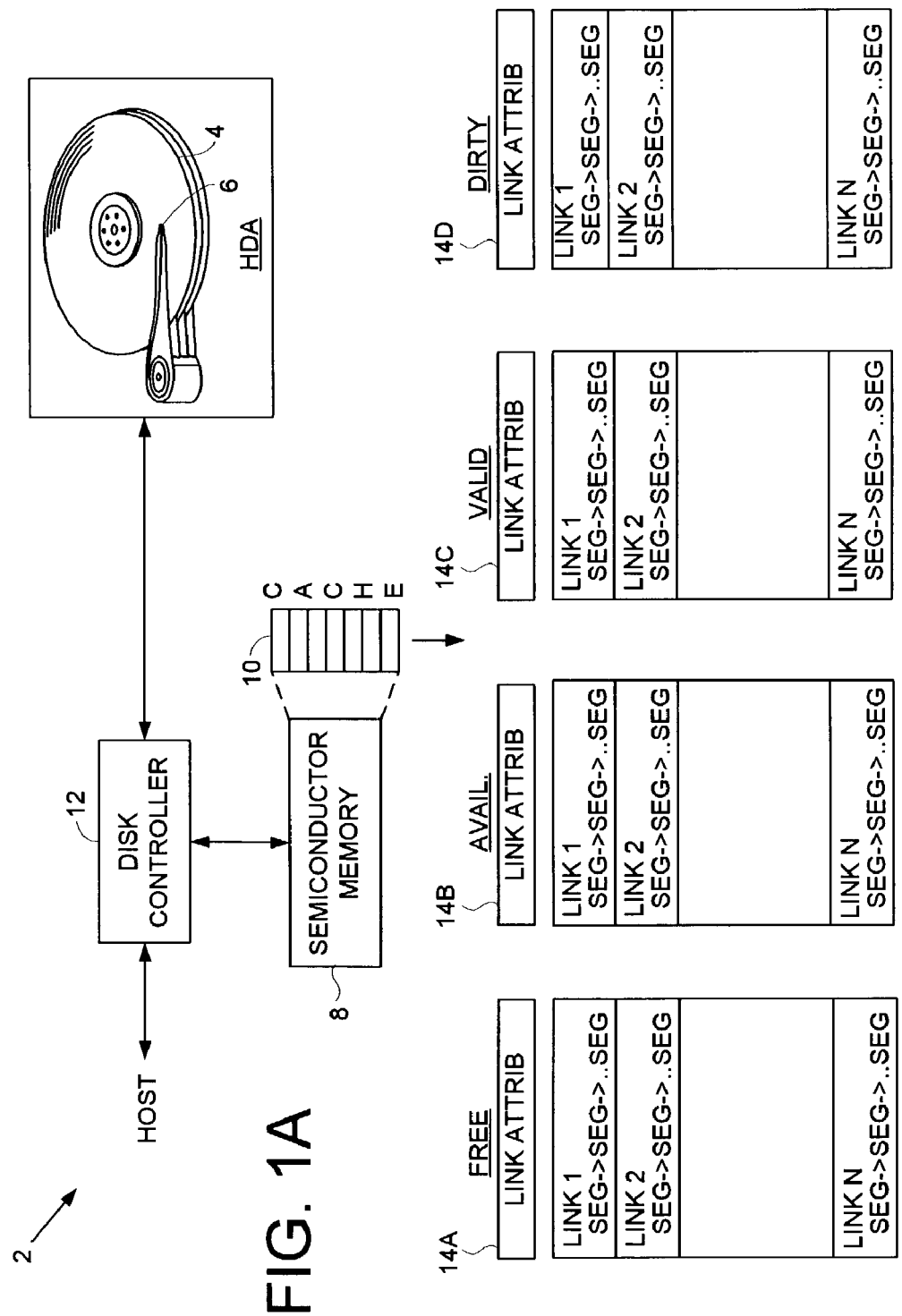

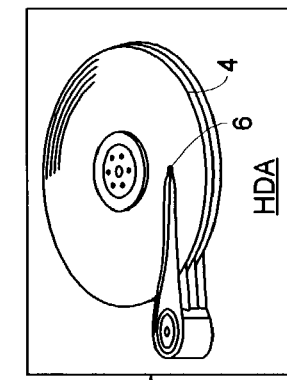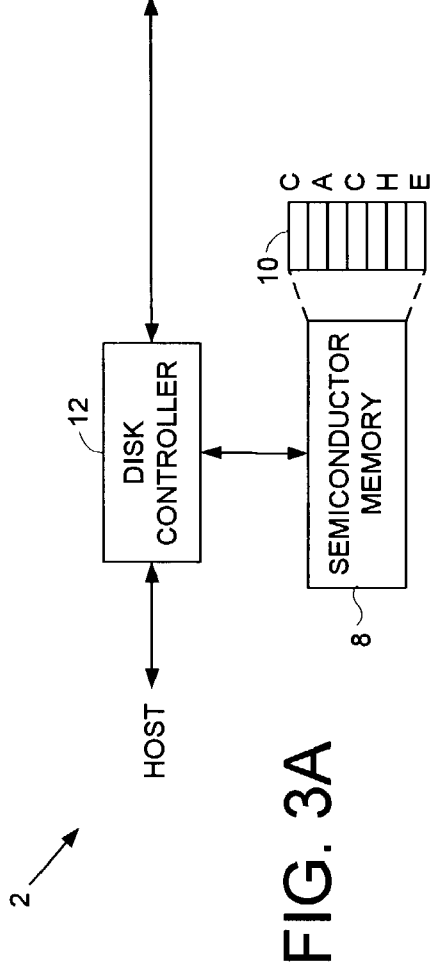
FIG. 3A
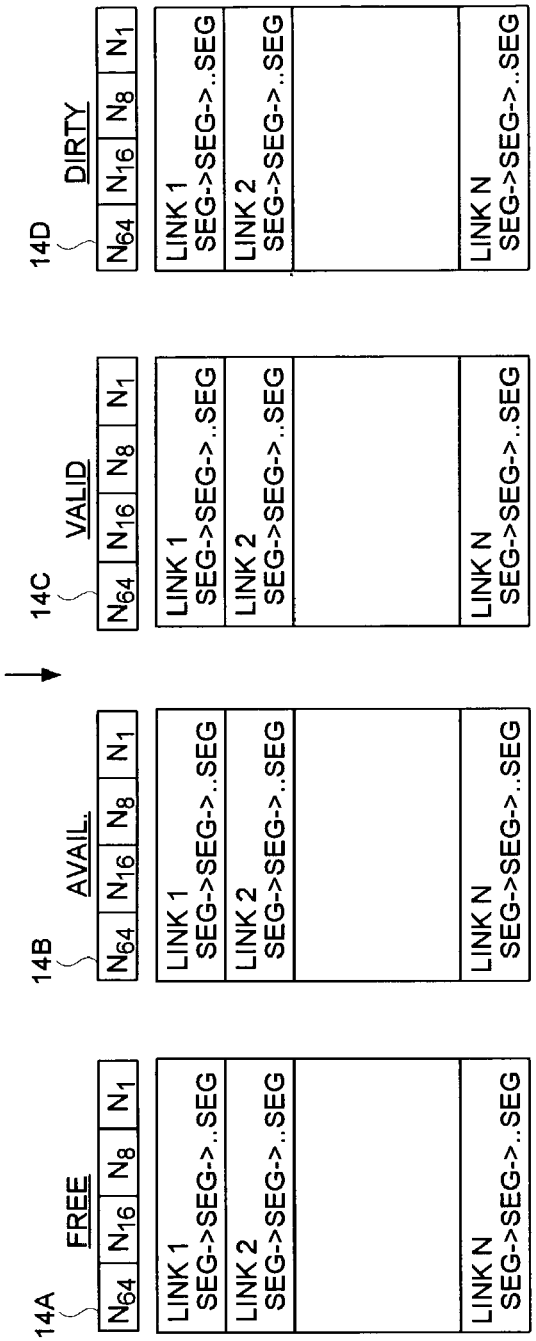
FIG. 3B

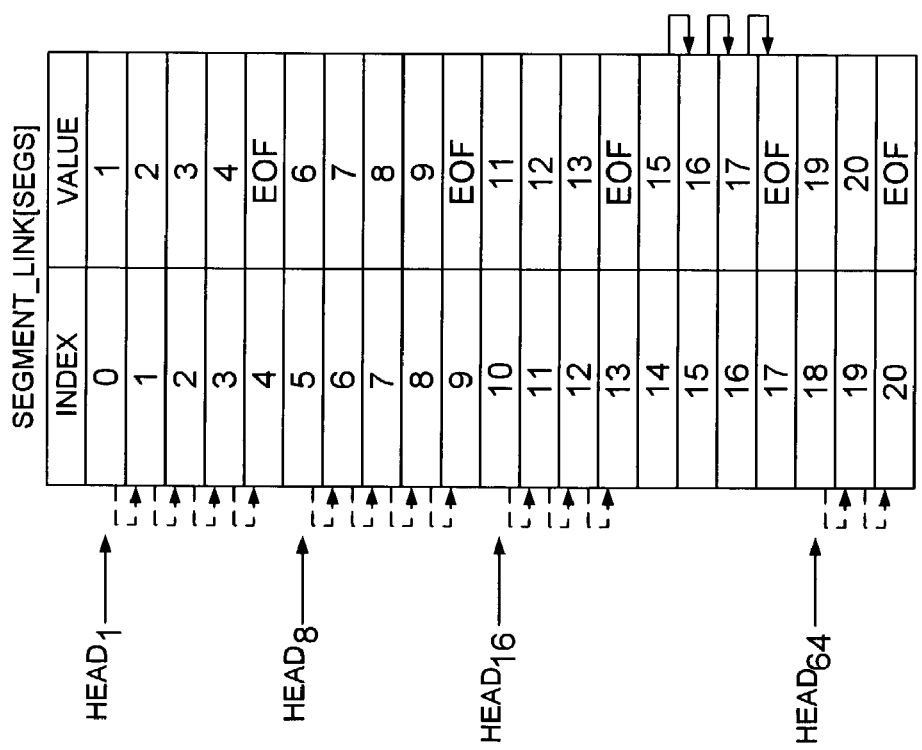

DISK DRIVE MAINTAINING A CACHE LINK ATTRIBUTE FOR EACH OF A PLURALITY OF ALLOCATION STATES

BACKGROUND OF THE INVENTION

1. Field of the Invention

The present invention relates to disk drives for computer systems. More particularly, the present invention relates to a disk drive maintaining a cache link attribute for each of a plurality of allocation states.

2. Description of the Prior Art

A disk drive typically comprises a cache memory for caching data written to the disk as well as data read from the disk. The overall performance of the disk drive is affected by how efficiently the cache memory can be allocated for a host command. In the past, the cache memory has been divided into cache segments each comprising a number of blocks (e.g., eight blocks), wherein the cache system would allocate a number of cache segments to process the host command. Accordingly, the cache segments can be in one of a plurality of allocation states, including at least:

- free—an unallocated cache segment;
- available—an allocated cache segment storing write data that has been written to the disk;
- valid—an allocated cache segment storing cached read data; and
- dirty—an allocated cache segment storing write data not yet written to the disk.

When a host command is received, the cache system allocates cache segments for the host command according to a predetermined allocation policy. For example, the cache system may allocate cache segments having a free allocation state, then cache segments having an available allocation state, then cache segments having a valid allocation state, and finally cache segments having a dirty allocation state until enough cache segments are allocated to process the host command.

There is, therefore, a need for a disk drive that can quickly identify cache segments in each of a plurality of allocation states in order to expedite the allocation process for a host command.

SUMMARY OF THE INVENTION

The present invention may be regarded as a disk drive comprising a disk, a head actuated radially over the disk, and a semiconductor memory comprising a cache buffer for caching data written to the disk and data read from the disk. The cache buffer comprises a plurality of cache segments linked together to form a plurality of cache links. A disk controller maintains at least one segment attribute associated with each cache segment, wherein the segment attribute comprises an allocation state selected from the group comprising at least:

- free—an unallocated cache segment;
- available—an allocated cache segment storing write data that has been written to the disk;
- valid—an allocated cache segment storing cached read data; and
- dirty—an allocated cache segment storing write data not yet written to the disk.

The disk controller further maintains at least one link attribute associated with the segment attributes within each cache link. When the disk controller receives a host command comprising a command size indicating a number of blocks of data associated with the host command, the disk controller evaluates the link attributes to allocate cache segments for a cache link associated with the host command.

In one embodiment, the disk controller modifies the cache links within the cache buffer to generate the cache link associated with the host command. In another embodiment, the disk controller instantiates a cache link within the cache buffer to generate the cache link associated with the host command.

In one embodiment, the link attribute identifies cache segments in one of the allocation states. In one embodiment, the link attribute identifies cache segments of a cache link in one of the allocation states.

In another embodiment, the segment attribute further comprises a memory type selected from the group comprising at least a system memory and a cache memory, and the link attribute identifies cache segments in one of the allocation states having one of the memory types. In one embodiment, the link attribute identifies cache segments of a cache link in one of the allocation states having one of the memory types.

In yet another embodiment, the disk comprises a plurality of tracks, each track comprising a plurality of blocks. The cache buffer comprises a plurality of segment pools, where each segment pool comprising a plurality of cache segments, and each cache segment comprises $2^k$ number of blocks where k is a predetermined integer for each segment pool. The link attribute further identifies cache segments in each of the segment pools for the allocation state. In one embodiment, the segment pools comprise a one-block segment pool, an eight-block segment pool, a sixteen-block segment pool, and a sixty-four-block segment pool. The link attributes comprise counters for tracking the number of cache segments within each segment pool and for each allocation state.

In one embodiment, the disk controller allocates cache segments having a free allocation state, and then cache segments having an available allocation state, and then cache segments having a valid allocation state, and then cache segments having a dirty allocation state, until enough cache segments are allocated for the host command. In one embodiment, the disk controller preserves a predetermined number of the cache segments having a valid allocation state by allocating cache segments for the host command from the plurality of cache segments having a dirty allocation state before allocating the predetermined number of the cache segments having a valid allocation state.

The present invention may also be regarded as method of allocating memory for a host command in a disk drive. The disk drive comprises a disk, a head actuated radially over the disk, and a semiconductor memory comprising a cache buffer for caching data written to the disk and data read from the disk. The cache buffer comprises a plurality of cache segments linked together to form a plurality of cache links. At least one segment attribute is associated with each cache segment, wherein the cache attribute comprises an allocation state selected from the group comprising at least:

- free—an unallocated cache segment; available—an allocated cache segment storing write data that has been written to the disk;
- valid—an allocated cache segment storing cached read data; and
- dirty—an allocated cache segment storing write data not yet written to the disk.

At least one link attribute is associated with the segment attributes within each cache link. A host command is received from a host computer, the host command comprising a command size indicating a number of blocks of data associated with the host command. The link attributes are evaluated to allocate cache segments for a cache link associated with the host command.

BRIEF DESCRIPTION OF THE DRAWINGS

FIG. 1A shows a disk drive according to an embodiment of the present invention comprising a disk, a head actuated radially over the disk, a disk controller, and a semiconductor memory comprising a cache buffer for storing a plurality of cache segments linked together to form a plurality of cache links.

FIG. 1B shows an embodiment of the present invention wherein a link attribute is associated with each of a plurality of allocation states, wherein the link attribute identifies cache segments within each of the allocation states.

FIGS. 3A–3B show an embodiment of the present invention wherein a link attribute identifies cache segments of different sizes for each allocation state.

FIGS. 8A–8B illustrate how the SEGMENT_LINK and FREE_SEG_LIST data structures are updated after allocating 4 sixty-four-block cache segments for a read command.

DESCRIPTION OF THE PREFERRED EMBODIMENTS

Figure 2A:
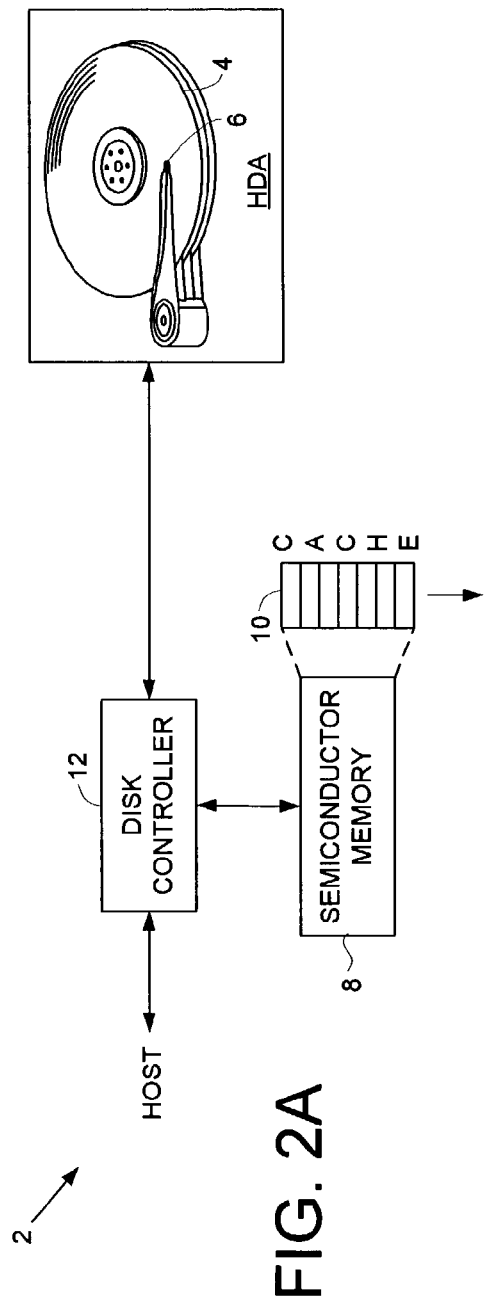
FIGS. 2A–2B show an embodiment of the present invention wherein a link attribute is associated with each cache link for identifying cache segments within each link for each allocation state.

FIG. 1A shows a disk drive 2 according to an embodiment of the present invention comprising a disk 4, a head 6 actuated radially over the disk 4, and a semiconductor memory 8 comprising a cache buffer 10 for caching data written to the disk 4 and data read from the disk 4. The cache buffer 10 comprises a plurality of cache segments linked together to form a plurality of cache links. A disk controller 12 maintains at least one segment attribute associated with each cache segment, wherein the segment attribute comprises an allocation state selected from the group comprising at least:

free—an unallocated cache segment;

available—an allocated cache segment storing write data that has been written to the disk;

valid—an allocated cache segment storing cached read data; and dirty—an allocated cache segment storing write data not yet written to the disk.

The disk controller 12 further maintains at least one link attribute 14A–14D associated with the segment attributes within each cache link. When the disk controller 12 receives a host command comprising a command size indicating a number of blocks of data associated with the host command, the disk controller 12 evaluates the link attributes to allocate cache segments for a cache link associated with the host command.

In one embodiment, the disk controller 12 modifies the cache links within the cache buffer 10 to generate the cache link associated with the host command. In another embodiment, the disk controller 12 instantiates a cache link within the cache buffer 10 to generate the cache link associated with the host command.

The link attribute 14A–14D may track any suitable attribute of the cache segments. In one embodiment, the link attribute identifies cache segments in one of the allocation states free, available, valid and dirty. For example, in one embodiment the link attribute 14A in FIG. 1B comprises a counter for tracking the number of cache segments having an allocation state of free. When a cache link is created to process a read command, the counter 14A tracking the free cache segments is decremented and the counter 14C tracking the valid cache segments is incremented by the number of cache segments in the cache link.

Figure 2B:
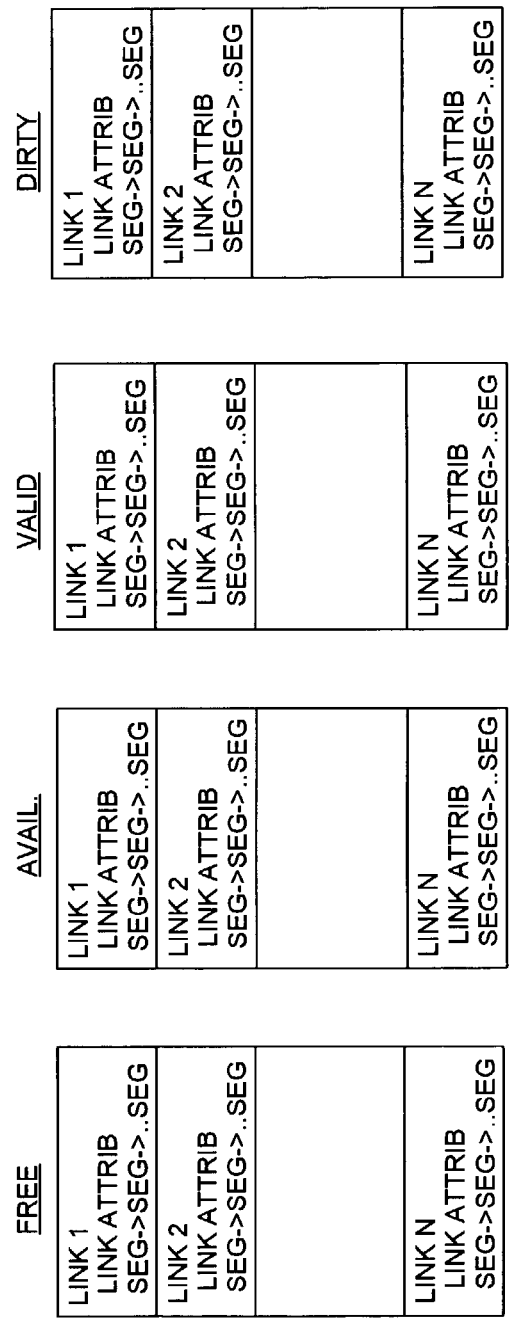

In one embodiment, the link attribute identifies cache segments of a cache link in one of the allocation states. This embodiment is illustrated in FIGS. 2A–2B wherein each link comprises a link attribute which tracks an attribute of the cache segments within each cache link. For example, the link attribute may comprise a counter for counting the number of cache segments within the cache link.

In another embodiment, the segment attribute further comprises a memory type selected from the group comprising at least a system memory and a cache memory, and the link attribute identifies cache segments in one of the allocation states having one of the memory types. In one embodiment, the link attribute identifies cache segments of a cache link in one of the allocation states having one of the memory types.

In yet another embodiment, the disk 4 comprises a plurality of tracks, each track comprising a plurality of blocks. The cache buffer 10 comprises a plurality of segment pools, where each segment pool comprising a plurality of cache segments, and each cache segment comprises $2^k$ number of blocks where k is a predetermined integer for each segment pool. As illustrated in FIGS. 3A–3B, in one embodiment the link attribute 14A–14D identifies cache segments in each of the segment pools for the allocation state. In the embodiment of FIG. 3B, the segment pools comprise a one-block segment pool, an eight-block segment pool, a sixteen-block segment pool, and a sixty-four-block segment pool. The link attribute 14A–14D comprise counters $N_{64}$, $N_{16}$, $N_8$ and $N_1$ for counting the number of cache segments in each of the segment pools for each of the allocation states. In an alternative embodiment, the link attribute 14A–14D comprises a bit field assigned to each of the segment pools. A "1" in the bit field indicates there is at least one cache segment in the segment pool for the allocation state, and a "0" in the bit field indicates there are no cache segments in the segment pool for the allocation state.

Figure 4A:
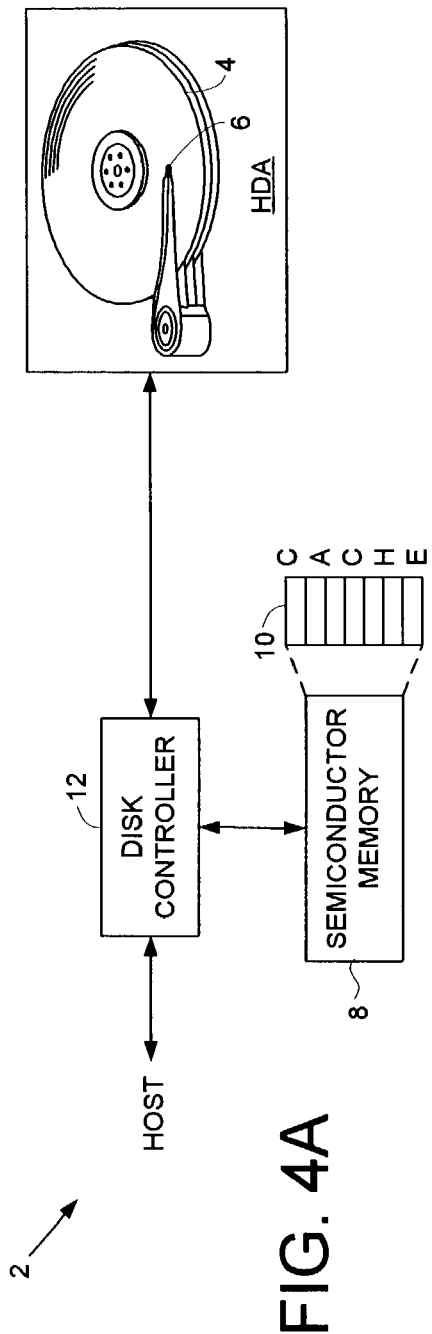
FIGS. 4A–4B show an embodiment of the present invention wherein a link attribute identifies cache segments of different sizes within each link for each allocation state.
Figure 4B:
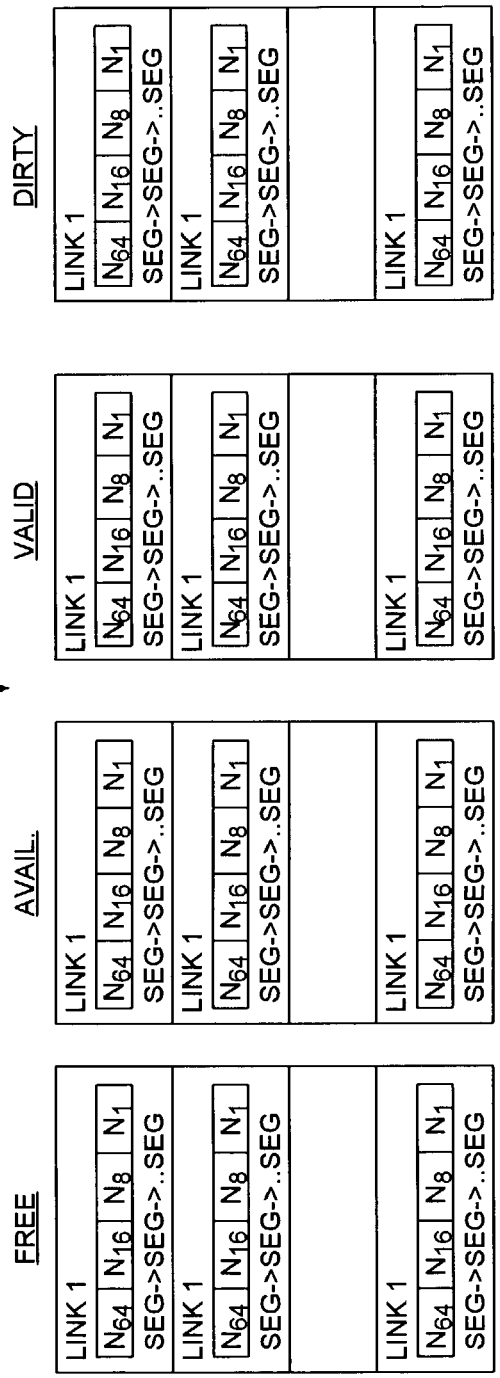

In an embodiment illustrated in FIGS. 4A–4B, each link within each allocation state comprises a link attribute which tracks the cache segments in each segment pool. In one embodiment, the link attribute identifies the number of cache segments within each segment pool, and in another embodiment, the link attribute comprises a bit field assigned to each of the segment pools for indicating whether there is at least one cache segment in each segment pool.

Figure 5A:
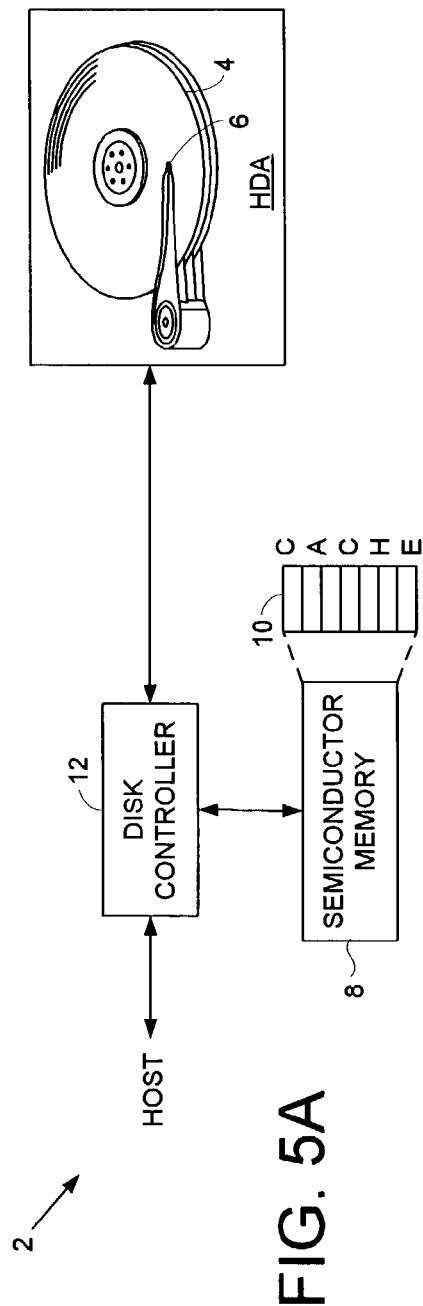
FIGS. 5A–5B show an embodiment of the present invention wherein a link attribute identifies cache segment sizes for all of the links as well as cache segment sizes for each link for each allocation state.
Figure 5B:
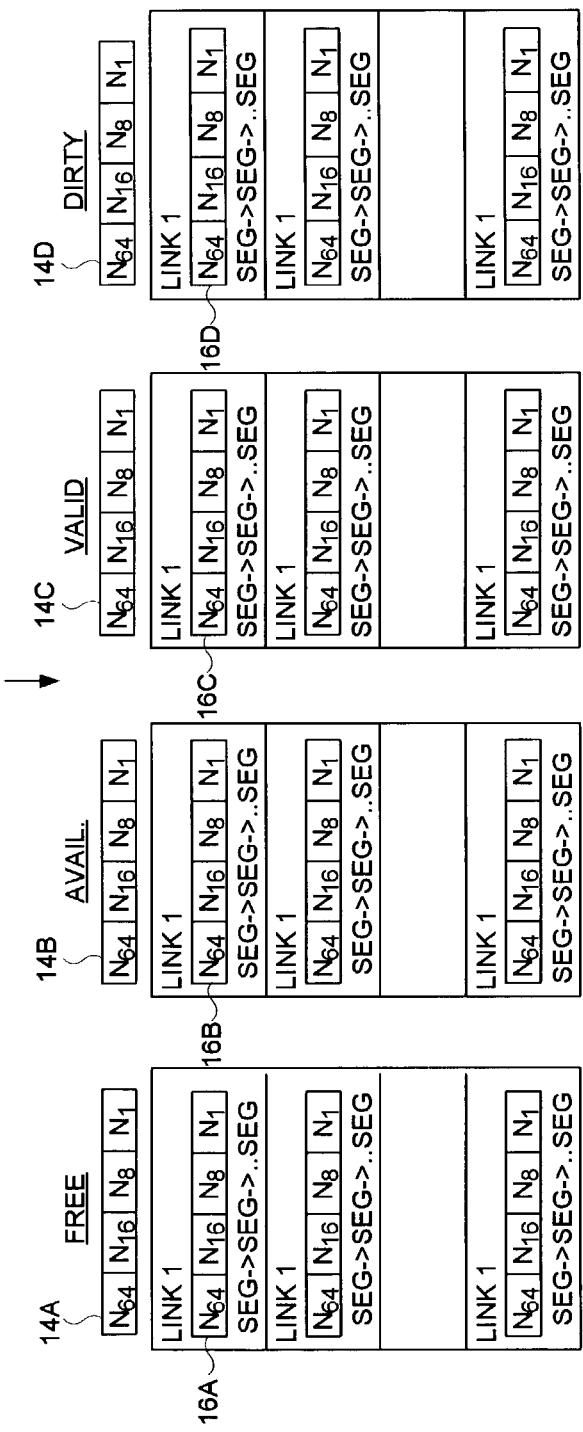

FIGS. 5A–5B show an embodiment of the present invention wherein the link attribute comprises an aggregate link attribute 14A–14D for tracking the cache segments in each of the segment pools for each of the allocation states, together with a local link attribute 16A–16D within each cache link for tracking the cache segments within each segment pool for the respective links. The aggregate and local link attributes may comprise counters for counting the cache segments or bit maps for identifying the existence of cache segments within each segment pool.

In one embodiment, the disk controller 12 allocates cache segments having a free allocation state, and then cache segments having an available allocation state, and then cache segments having a valid allocation state, and then cache segments having a dirty allocation state, until enough cache segments are allocated for the host command. Before the cache segments having a dirty allocation state are allocated to a new host command, the disk controller 12 writes the write data stored in the cache segments to the disk 4. The disk controller 12 evaluates the link attributes to identify the existence and/or number of cache segments within each of the allocation states, and in one embodiment, within each of a plurality of segment pools (FIG. 5B). In this manner the disk controller 12 can quickly identify the resources available within each allocation state without having to analyze the links individually.

In one embodiment, the disk controller 12 preserves a predetermined number of the cache segments having a valid allocation state by allocating cache segments for the host command from the plurality of cache segments having a dirty allocation state before allocating the predetermined number of the cache segments having a valid allocation state. Although de-allocating the dirty cache segments requires data to be written to the disk, this embodiment improves performance when there are cache hits within the preserved area of the valid cache segments.

Figure 6:
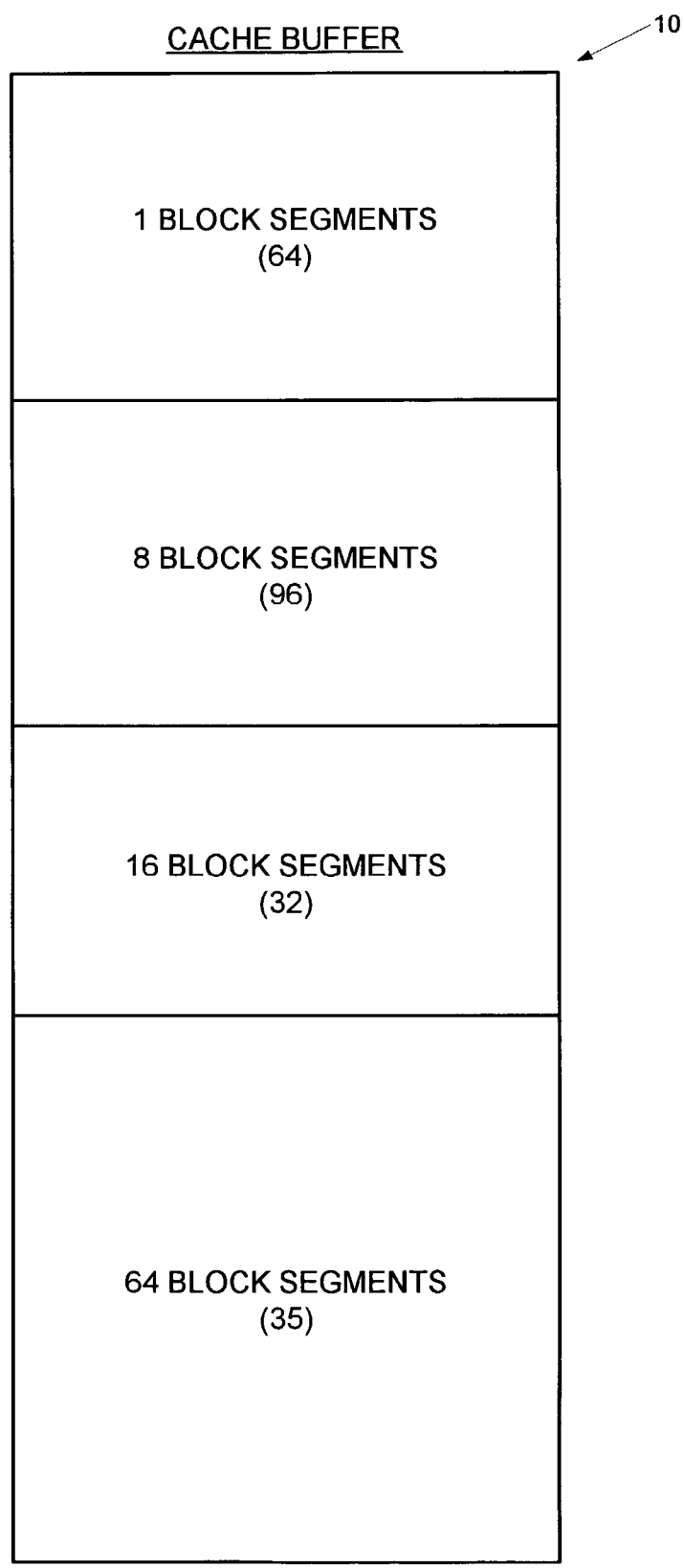
FIG. 6 shows an embodiment of the present invention wherein the cache buffer comprises a plurality of segment pools, each segment pool comprises a plurality of cache segments, and each cache segment comprises $2^k$ number of blocks where k is a predetermined value for each segment pool.

FIG. 6 shows an embodiment of the present invention wherein the cache buffer 10 comprises 64 one-block cache segments, 96 eight-block cache segments, 32 sixteen-block cache segments, and 35 sixty-four-block cache segments. Any suitable number of cache segments may be employed within each segment pool. In addition, any suitable number of segment pools having cache segments comprising a variable number of blocks may be employed.

Figures 7A, 7B:
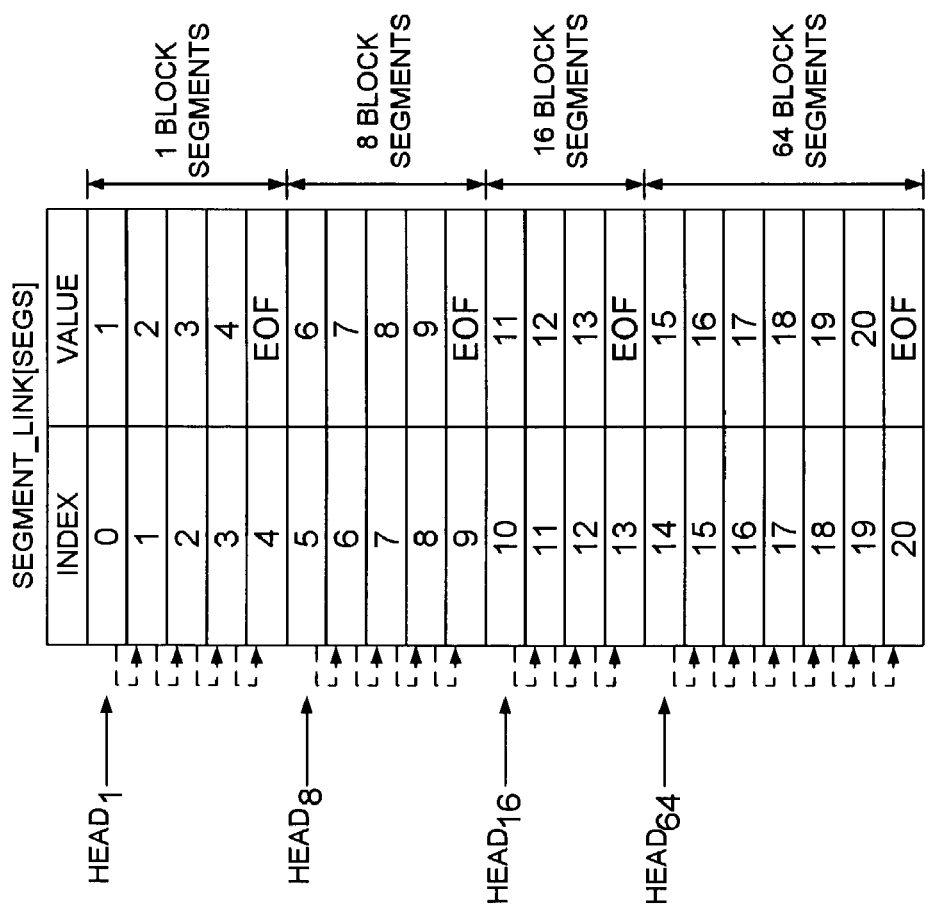
FIG. 7A show an embodiment of the present invention wherein a SEGMENT_LINK data structure maintains a linked list of cache segments for respective read and write commands.
FIG. 7B shows an embodiment of the present invention wherein a FREE_SEG_LIST data structure maintains a head pointer and count for the free cache segments in each segment pool of FIG. 6.

FIG. 7A show an embodiment of the present invention wherein a SEGMENT_LINK data structure maintains a linked list of cache segments for respective read and write commands. The INDEX field identifies the segment number within the cache buffer 10, and the VALUE field points to the next cache segment within the link. The SEGMENT_LINK data structure is initialized so that the cache segments are linked together within each segment pool as illustrated in FIG. 7A. FIG. 7B shows a FREE_SEG_LIST data structure which maintains a HEAD pointer into each segment pool and COUNT field which identifies the number of free cache segments within each segment pool. The INDEX field of the FREE_SEG_LIST data structure corresponds to the segment pool size (i.e., $2^k$ number of blocks). In this example, the cache buffer 10 comprises 5 one-block cache segments, 5 eight-block cache segments, 4 sixteen-block cache segments, and 7 sixty-four-block cache segments. The HEAD pointer is initialized to the first cache segment of each segment pool as illustrated in FIGS. 7A and 7B.

FIGS. 8A–8B illustrate how the SEGMENT_LINK and FREE_SEG_LIST data structures are updated after allocating 4 sixty-four-block cache segments for a read command. Each new cache segment is allocated from the $HEAD_{64}$ pointer, and the $BEAD_{64}$ pointer is re-assigned to point to the cache segment specified in the VALUE field. The VALUE field of the last cache segment allocated (17 in this example) is assigned EOF to identify it as the end of the link. As shown in FIG. 8B, after allocating the 4 sixty-four-block cache segments the $HEAD_{64}$ pointer (corresponding to INDEX 6 in the FREE_SEG_LIST) points to cache segment 18, and the COUNT field is decremented by 4.

Figures 9A, 9B:
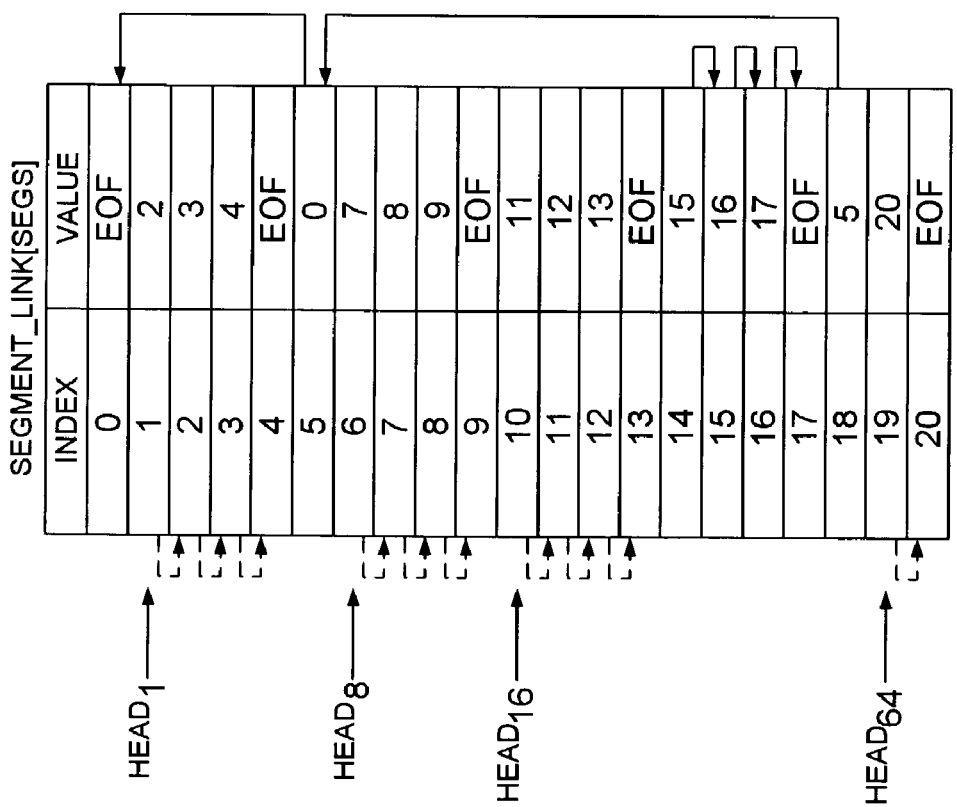
FIGS. 9A–9B illustrate how the SEGMENT_LINK and FREE_SEG_LIST data structures are updated after allocating 1 sixty-four-block cache segment, 1 eight-block cache segment, and 1 one-block cache segment for a write command.

FIGS. 9A–9B illustrate how the SEGMENT_LINK and FREE_SEG_LIST data structures are updated after allocating 1 sixty-four-block cache segment, 1 eight-block cache segment, and 1 one-block cache segment for a write command. The sixty-four-block cache segment is allocated from the $HEAD_{64}$ pointer, and the $HEAD_{64}$ pointer is re-assigned to its VALUE field (i.e., to cache segment 19). The VALUE field for the cache segment 18 is assigned to the $HEAD_8$ pointer (i.e., cache segment 5), and the $HEAD_8$ pointer is re-assigned to its VALUE field (i.e., to cache segment 6). The VALUE field for the cache segment 5 is assigned to the $HEAD_1$ pointer (i.e., cache segment 0), and the $HEAD_1$ pointer is re-assigned to its VALUE field (i.e., to cache segment 1). The VALUE field for the cache segment 0 is assigned EOF since it identifies the end of the link. The COUNT fields in the 0, 3 and 6 entries of the FREE_SEG_LIST are decremented by one.

Figures 10A, 10B:
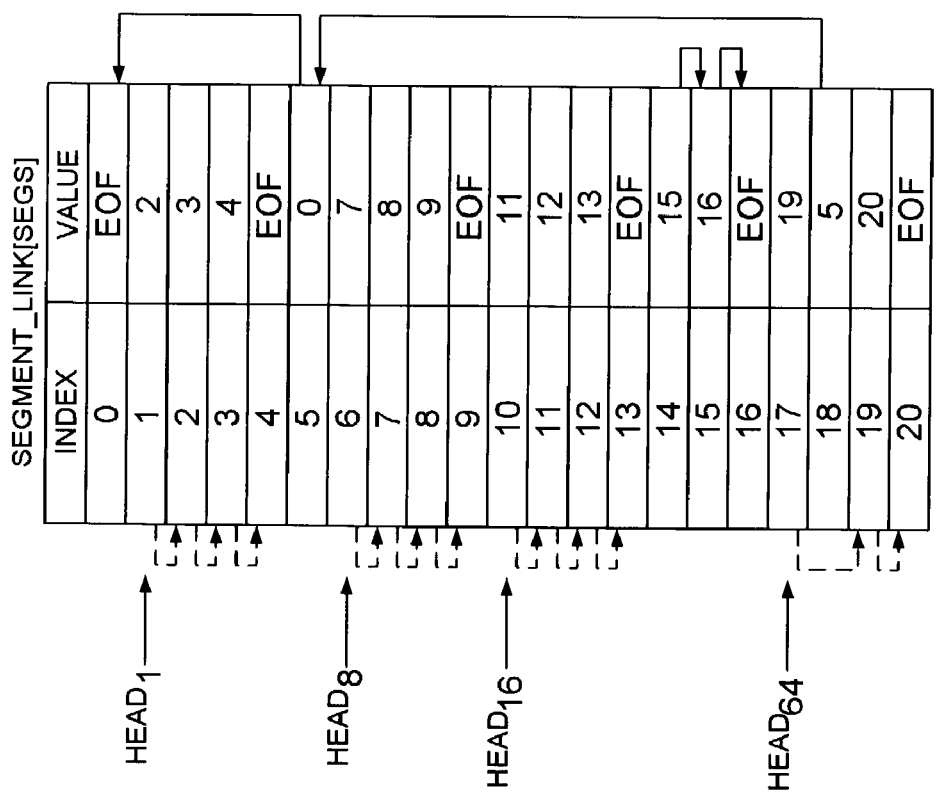
FIGS. 10A–10B illustrate how the SEGMENT_LINK and FREE_SEG_LIST data structures are updated after de-allocating 1 of the sixty-four-block cache segments for the read command of FIG. 8A.

FIGS. 10A–10B illustrate how the SEGMENT_LINK and FREE_SEG_LIST data structures are updated after de-allocating 1 of the sixty-four-block cache segments for the read command of FIG. 8A. In this embodiment, the last cache segment of the link (cache segment 17) is de-allocated first. The VALUE field of the de-allocated cache segment is assigned to the $HEAD_{64}$ pointer (i.e., to cache segment 19), and the $HEAD_{64}$ pointer is re-assigned to the de-allocated cache segment (i.e., to cache segment 17). The COUNT field in the 6 entry of the FREE_SEG_LIST is incremented by one.

We claim:

1. A disk drive comprising:
   (a) a disk;
   (b) a head actuated radially over the disk;
   (c) a semiconductor memory comprising a cache buffer for caching data written to the disk and data read from the disk, the cache buffer comprising a plurality of cache segments linked together to form a plurality of cache links; and (d) a disk controller for:
maintaining at least one segment attribute associated with each cache segment, the segment attribute comprising an allocation state selected from the group consisting of at least:
free—an unallocated cache segment;
available—an allocated cache segment storing write data that has been written to the disk;
valid—an allocated cache segment storing cached read data; and
dirty—an allocated cache segment storing write data not yet written to the disk;
maintaining at least one link attribute associated with the segment attributes within each cache link;
receiving a host command from a host computer, the host command comprising a command size indicating a number of blocks of data associated with the host command; and
evaluating the link attributes to allocate cache segments for a cache link associated with the host command.

2. The disk drive as recited in claim 1, wherein the disk controller modifies the cache links within the cache buffer to generate the cache link associated with the host command.

3. The disk drive as recited in claim 1, wherein the disk controller instantiates a cache link within the cache buffer to generate the cache link associated with the host command.

4. The disk drive as recited in claim 1, wherein the link attribute identifies cache segments in one of the allocation states.

5. The disk drive as recited in claim 4, wherein:
(a) the disk comprises a plurality of tracks, each track comprising a plurality of blocks;
(b) the cache buffer comprising a plurality of segment pools, each segment pool comprising a plurality of cache segments, and each cache segment comprises $2^k$ number of blocks where k is a predetermined integer for each segment pool; and
(c) the link attribute further identifies cache segments in each of the segment pools for the allocation state.

6. The disk drive as recited in claim 5, wherein the segment pools comprise a one-block segment pool, an eight-block segment pool, a sixteen-block segment pool, and a sixty-four-block segment pool.

7. The disk drive as recited in claim 1, wherein the link attribute identifies cache segments of a cache link in one of the allocation states.

8. The disk drive as recited in claim 7, wherein:
(a) the disk comprises a plurality of concentric tracks, each track comprising a plurality of blocks;
(b) the cache buffer comprising a plurality of segment pools, each segment pool comprising a plurality of cache segments, and each cache segment comprises $2^k$ number of blocks where k is a predetermined integer for each segment pool; and
(c) the link attribute further identifies cache segments in each of the segment pools for the allocation state.

9. The disk drive as recited in claim 8, wherein the segment pools comprise a one-block segment pool, an eight-block segment pool, a sixteen-block segment pool, and a sixty-four-block segment pool.

10. The disk drive as recited in claim 1, wherein:
(a) the segment attribute further comprises a memory type selected from the group comprising at least a system memory and a cache memory; and
(b) the link attribute identifies cache segments in one of the allocation states having one of the memory types.

11. The disk drive as recited in claim 1, wherein:
(a) the segment attribute further comprises a memory type selected from the group comprising at least a system memory and a cache memory; and
(b) the link attribute identifies cache segments of a cache link in one of the allocation states having one of the memory types.

12. The disk drive as recited in claim 1, wherein the disk controller allocates cache segments having a free allocation state, and then cache segments having an available allocation state, and then cache segments having a valid allocation state, and then cache segments having a dirty allocation state, until enough cache segments are allocated for the host command.

13. The disk drive as recited in claim 12, wherein the disk controller preserves a predetermined number of the cache segments having a valid allocation state by allocating cache segments for the host command from the plurality of cache segments having a dirty allocation state before allocating the predetermined number of the cache segments having a valid allocation state.

14. A method of allocating memory for a host command in a disk drive, the disk drive comprising a disk, a head actuated radially over the disk, and a semiconductor memory comprising a cache buffer for caching data written to the disk and data read from the disk, the cache buffer comprising a plurality of cache segments linked together to form a plurality of cache links, the method comprising the steps of:
(a) maintaining at least one segment attribute associated with each cache segment, the segment attribute comprising an allocation state selected from the group consisting of at least:
free—an unallocated cache segment;
available—an allocated cache segment storing write data that has been written to the disk;
valid—an allocated cache segment storing cached read data; and
dirty—an allocated cache segment storing write data not yet written to the disk;
(b) maintaining at least one link attribute associated with the segment attributes within each cache link;
(c) receiving a host command from a host computer, the host command comprising a command size indicating a number of blocks of data associated with the host command; and
(d) evaluating the link attributes to allocate cache segments for a cache link associated with the host command.

15. The method as recited in claim 14, further comprising the step of modifying the cache links within the cache buffer to generate the cache link associated with the host command.

16. The method as recited in claim 14, further comprising the step of instantiating a cache link within the cache buffer to generate the cache link associated with the host command.

17. The method as recited in claim 14, wherein the link attribute identifies cache segments in one of the allocation states.

18. The method as recited in claim 17, wherein:
(a) the disk comprises a plurality of tracks, each track comprising a plurality of blocks;
(b) the cache buffer comprising a plurality of segment pools, each segment pool comprising a plurality of cache segments, and each cache segment comprises $2^k$ number of blocks where k is a predetermined integer for each segment pool; and (c) the link attribute further identifies cache segments in each of the segment pools for the allocation state.

19. The method as recited in claim 18, wherein the segment pools comprise a one-block segment pool, an eight-block segment pool, a sixteen-block segment pool, and a sixty-four-block segment pool.

20. The method as recited in claim 14, wherein the link attribute identifies cache segments of a cache link in one of the allocation states.

21. The method as recited in claim 20, wherein:
   (a) the disk comprises a plurality of concentric tracks, each track comprising a plurality of blocks;
   (b) the cache buffer comprising a plurality of segment pools, each segment pool comprising a plurality of cache segments, and each cache segment comprises $2^k$ number of blocks where k is a predetermined integer for each segment pool; and
   (c) the link attribute further identifies cache segments in each of the segment pools for the allocation state.

22. The method as recited in claim 21, wherein the segment pools comprise a one-block segment pool, an eight-block segment pool, a sixteen-block segment pool, and a sixty-four-block segment pool.

23. The method as recited in claim 14, wherein:
   (a) the segment attribute further comprises a memory type selected from the group comprising at least a system memory and a cache memory; and
   (b) the link attribute identifies cache segments in one of the allocation states having one of the memory types.

24. The method as recited in claim 14, wherein:
   (a) the segment attribute further comprises a memory type selected from the group comprising at least a system memory and a cache memory; and
   (b) the link attribute identifies cache segments of a cache link in one of the allocation states having one of the memory types.

25. The method as recited in claim 14, wherein the cache segments having a free allocation state are allocated first, and then cache segments having an available allocation state, and then cache segments having a valid allocation state, and then cache segments having a dirty allocation state, until enough cache segments are allocated for the host command.

26. The method as recited in claim 25, wherein a predetermined number of the cache segments having a valid allocation state are preserved by allocating cache segments for the host command from the plurality of cache segments having a dirty allocation state before allocating the predetermined number of the cache segments having a valid allocation state.

* * * * *